US010595290B2

(12) United States Patent
Sågfors et al.

(10) Patent No.: US 10,595,290 B2
(45) Date of Patent: *Mar. 17, 2020

(54) METHODS AND ARRANGEMENTS FOR A MOBILE COMMUNICATIONS NETWORK (71) Applicant: Telefonaktiebolaget LM Ericsson (publ), Stockholm (SE)

(72) Inventors: Mats Fredrik Sågfors, Kyrkslött (FI); Magnus Johansson, Göteborg (SE); George Jöngren, Sundbyberg (SE); Magnus Stattin, Sollentuna (SE); Per Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

This patent is subject to a terminal disclaimer.

(21) Appl. No.: 15/978,244

(22) Filed: May 14, 2018

(65) Prior Publication Data

US 2018/0263005 A1 Sep. 13, 2018

Related U.S. Application Data (63) Continuation of application No. 14/055,373, filed on Oct. 16, 2013, now Pat. No. 9,974,034, which is a (Continued)

(51) Int. Cl.
H04W 56/00 (2009.01)
H04W 28/18 (2009.01)
H04W 76/20 (2018.01)

(52) U.S. Cl.
CPC ......... H04W 56/001 (2013.01); H04W 28/18 (2013.01); H04W 76/20 (2018.02)

(58) Field of Classification Search
None
See application file for complete search history.

(56) References Cited

U.S. PATENT DOCUMENTS 6,058,311 A 5/2000 Tsukagoshi
6,898,429 B1 * 5/2005 Vialen .................. H04W 68/00
455/432.1
(Continued)

FOREIGN PATENT DOCUMENTS

EP 1519595 A1 3/2005
EP 1530394 A1 5/2005
(Continued)

OTHER PUBLICATIONS

3rd Generation Partnership Project, "3rd Generation Partnership Project; Technical Speification Group Radio Access Network; Evolved Universal Terrestrial Radio Access (E-UTRA) Radio Resource Control (RRC); Protocol Specification (Release 8)", Technical Specification, 3GPP TS 36.331 V8.0.0, Dec. 1, 2007, pp. 1-56, 3GPP.

(Continued)

Primary Examiner — Jamaal Henson
(74) Attorney, Agent, or Firm — Coats + Bennett, PLLC (57) ABSTRACT A procedure for synchronization of re-configuration of RRC procedures between the radio base station and the UE is achieved by associating a new configuration to be used by a UE with an additional UE identity. The UE is normally identified by a first UE identity, but is informed in a re-configuration message that the UE also has the additional UE identity. The UE is identified by the additional UE identity when the new configuration is to be activated. Hence, when the radio base station detects that the UE responds to requests, which included the additional UE identity, the radio base station can conclude that the UE has activated the new configuration.

14 Claims, 6 Drawing Sheets

Related U.S. Application Data continuation of application No. 12/865,914, filed as application No. PCT/SE2008/051469 on Dec. 16, 2008, now Pat. No. 8,588,157.

(60) Provisional application No. 61/025,896, filed on Feb. 4, 2008.

(56) References Cited

U.S. PATENT DOCUMENTS

| | | |
|---|---|---|
| 8,320,929 B2 | 11/2012 | Torsner et al. |
| 8,774,822 B2 | 7/2014 | Sarkkinen et al. |
| 2001/0036169 A1 | 11/2001 | Ratzel |
| 2004/0057387 A1 | 3/2004 | Yi et al. |
| 2004/0192281 A1 | 9/2004 | Aerrabotu et al. |
| 2005/0070273 A1* | 3/2005 | Farnsworth ........... H04W 60/00 455/432.1 |
| 2005/0101299 A1* | 5/2005 | Farnsworth ............. H04W 4/12 455/412.1 |
| 2005/0208945 A1 | 9/2005 | Hong et al. |
| 2006/0114877 A1 | 6/2006 | Heo et al. |
| 2008/0192687 A1 | 8/2008 | Kuo et al. |
| 2008/0198763 A1 | 8/2008 | Fischer et al. |
| 2010/0135220 A1 | 6/2010 | Bergstrom et al. |
| 2010/0238799 A1 | 9/2010 | Sebire |
| 2010/0323736 A1 | 12/2010 | Fischer et al. |

FOREIGN PATENT DOCUMENTS

| | | |
|---|---|---|
| EP | 1781057 A1 | 5/2007 |
| KR | 20040027916 A | 4/2004 |
| KR | 20060123542 A | 12/2006 |
| RU | 2305370 C2 | 8/2007 |
| WO | 0054521 A2 | 9/2000 |
| WO | 2006/033636 A1 | 3/2006 |
| WO | 2006/118426 A1 | 11/2006 |
| WO | 2007023351 A2 | 3/2007 |
| WO | 2007121366 A1 | 10/2007 |

OTHER PUBLICATIONS

Ericsson, "Synchronized RRC Re-Configuration", TSG-RAN WG2 #61, Sorrento, Italy, Feb. 11, 2008, pp. 1-5, R2-080762, 3GPP.

3rd Generation Partnership Project. "RACH Model." 3GPP TSG-RAN WG2 Meeting #57, R2-070453, St. Louis, USA, Feb. 12-16, 2007.

3GPP TSG-RAN Meeting #6, Change on U-and C-RTNTI definitions, Dec. 13-15, 1999, 3GPP, pp. 1-3, Nice France.

3rd Generation Partnership Project, "Technical Specification Group Radio Access Network; Radio Resource Control (RRC); Protocol specification (Release 13)", 3GPP TS 25.331 V13.5.0, Dec. 2016, pp. 1-2271.

\* cited by examiner

METHODS AND ARRANGEMENTS FOR A MOBILE COMMUNICATIONS NETWORK

RELATED APPLICATIONS

This application is a continuation of U.S. application Ser. No. 14/055,373, filed 16 Oct. 2013, which application is a continuation of U.S. application Ser. No. 12/865,914, filed 3 Aug. 2010, which issued as U.S. Pat. No. 8,588,157 on 19 Nov. 2013, which was the National Stage of International Application No. PCT/SE2008/051469, filed 16 Dec. 2008, which claims the benefit of U.S. Provisional Application No. 61/025,896, filed on 4 Feb. 2008. The disclosures of each of these applications are incorporated herein by reference in their entirety.

TECHNICAL FIELD

The present disclosure relates to methods and arrangements for a mobile communications network. In particular, the present disclosure relates to synchronization of radio resource control procedures.

BACKGROUND

UTRAN (Universal Terrestrial Radio Access Network) is a term identifying the radio access network of a UMTS (Universal Mobile Telecommunications System), wherein the UTRAN consists of Radio Network Controllers (RNCs) and NodeBs i.e., radio base stations. The NodeBs communicate wirelessly with mobile user equipments (UEs) and the RNCs control the NodeBs. The RNCs are further connected to the Core Network (CN). Evolved UTRAN (E-UTRAN) is an evolution of the UTRAN towards a high-data rate, low-latency and packet-optimized radio access network. Further, the E-UTRAN consists of radio base stations (eNBs), and the eNBs are interconnected and further connected to the Evolved Packet Core network (EPC). E-UTRAN is also being referred to as Long Term Evolution (LTE) and is standardized within the 3$^{rd}$ Generation Partnership Project (3GPP).

The Radio Resource Control Protocol (defined in TS 36.331) is the signaling protocol responsible for configuring and re-configuring lower layers of the UE. These lower layers include the physical layer, Medium Access Control (MAC), Radio Link Control Protocol (RLC), and Packet Data Convergence Protocol (PDCP). RRC is also responsible for configuring and re-configuring e.g., UE measurements, and the RRC protocol is also in control of connected mode mobility. The RRC protocol is terminated in the eNB and the UE, respectively.

Figure 1:
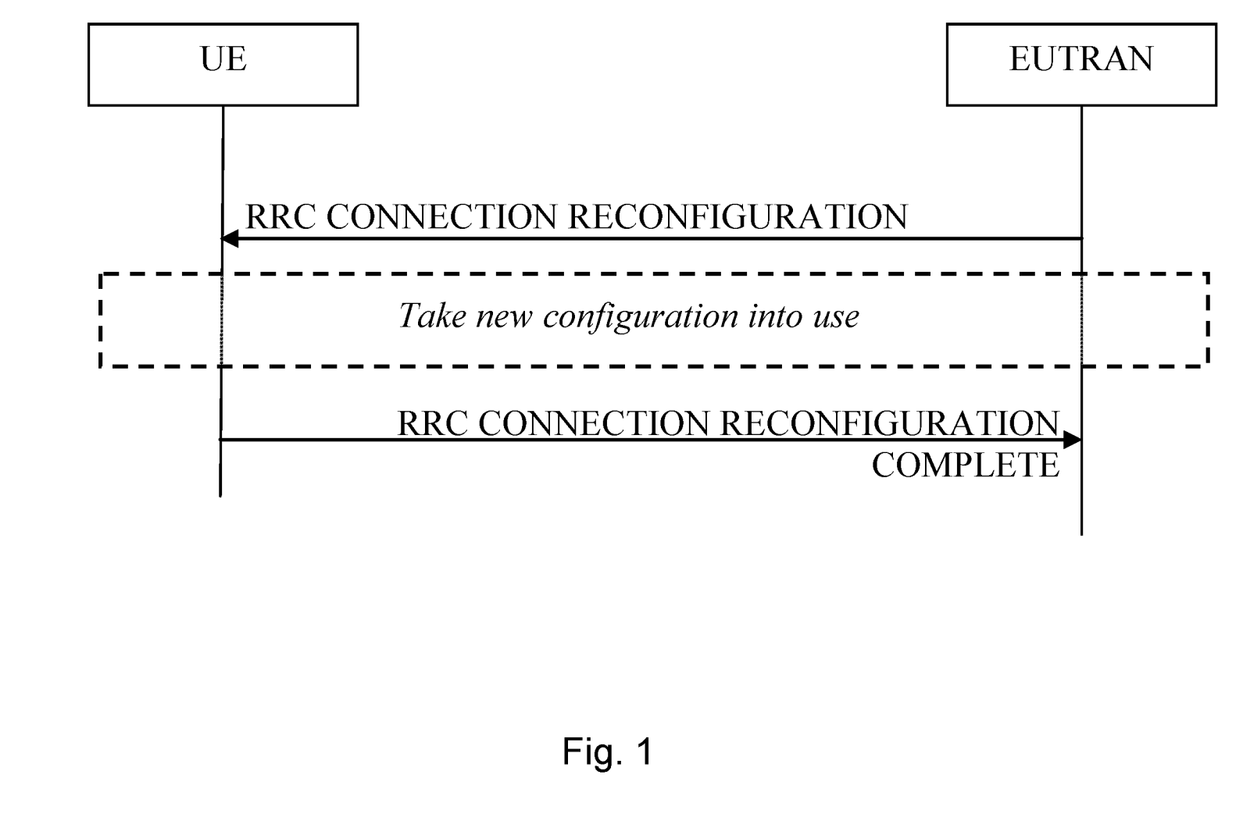
FIG. 1 illustrates an RRC re-configuration procedure according to prior art.

The RRC specification includes several functions and procedures. One function is related to the re-configuration of the UE, as illustrated in FIG. 1.

In this procedure, the eNB in the E-UTRAN issues a reconfiguration message transmitted to a UE. Upon successful reception of the message and in case the reconfiguration procedure is successfully completed, the UE reconfigures the parameters and functions indicated in the reconfiguration message, and responds with a compete-message to the eNB. The reconfiguration message could have a large variety of content, including e.g., L1, MAC, RLC, PDCP or measurement parameters. A handover may also be commanded with the same message.

In scheduled transmissions on a shared channel, a UE identity of a scheduled transmission must also be conveyed on an out-band control channel (HS-SCCH in UTRAN downlink, and PDCCH in E-UTRAN) to identify which UE the scheduling command is intended for. In UTRAN and E-UTRAN this identity is not explicitly transmitted, but implicitly included in the CRC calculation and the HS-SCCH channel coding.

The aforementioned identity must be unique for the UE, in case only a single UE is scheduled. In UTRAN, this downlink (HS-DSCH) identity is called HS-RNTI, while uplink (E-DCH) scheduling is based on an E-RNTI (RNTI—Radio Network Temporary Identity). In LTE, the current abbreviation for the unique UE identity is C-RNTI, where "C" reflects that this UE identity is unique for the UE in this cell. An UE may obey scheduling commands associated with several such identities.

In LTE, scheduling is the responsibility of the eNB—both in the uplink and the downlink:

In the downlink (DL), information on the PDCCH is sent in parallel with the data on the DL-SCH, such that the right UE can decode the data correctly.

In the uplink (UL), information on the PDCCH is sent prior to the event when the UE should send its data on UL-SCH, such that the UE can encode and transmit the data correctly.

To successfully receive the aforementioned data, it is important that the two peers (UE and eNB) have compatible configurations.

In the communication between the UE and the eNB, it is often critical that the two peers have compatible configurations, i.e., that the transmitter and receiver uses compatible ways of communicating on all protocol levels. Therefore, it is important or at least desirable that the UE and eNB takes the new reconfiguration into use at the same time.

It should be noted that the aforementioned RRC reconfiguration message is transmitted over the air interface that is subject to strong variations in link quality such as fast and slow fading resulting in transmission errors. Therefore, the reconfiguration message can be lost or delayed by re-transmissions by lower layer protocols. LTE RLC supports ARQ (automatic repeat request) and LTE MAC supports Hybrid ARQ to recover from such transmission errors.

Thus, it may be difficult for the eNB to exactly know when the UE has taken a new configuration into use. It should also be noted that ARQ and HARQ feedback is subject to transmission errors, why such indications only give a hint of when the UE may have successfully received the RRC connection re-configuration message. Uncertainty of the required UE processing time to complete the reconfiguration procedures indicated in the message will further add to the uncertainty of when the UE is prepared to switch from one configuration to another. This timing uncertainty of when the reconfiguration is competed is illustrated with a dashed box in FIG. 1.

In a particular example, the case when the eNB issues a Layer 1 MIMO reconfiguration is considered, where a UE is currently configured to receive the Physical Downlink Shared Channel (PDSCH) with e.g., transmit diversity, but the desire is to reconfigure PDSCH to spatial multiplexing. Clearly, a UE configured to one of a set of available MIMO schemes will not be able to receive PDSCH if the transmitter (eNB) is using a different scheme. Thus, if the reconfiguration of the PDSCH is asynchronous, there is a risk that the connectivity between the UE and the eNB is lost.

Consider e.g., the case where a HARQ feedback error occurs during the transmission of the DL RRC CONNECTION RECONFIGURATION message containing a critical L1 reconfiguration. A HARQ feedback error denotes the case when the HARQ transmitter misinterprets the feedback received from the receiver.

Assume that a negative acknowledgement (NACK) was interpreted as a positive acknowledgement (ACK) by the eNB. We refer to this error as an NACK-to-ACK error.

In this case, eNB will assume that the UE has successfully received the reconfiguration message and will take the new configuration into use within, say, 10 ms after the reception of the falsely decoded ACK. However, as the eNB then switches to the new configuration, the UE will not be able to receive any data on the reconfigured PDSCH, as the UE did not receive the reconfiguration message. Similarly, the eNB may lack means to receive any UL transmissions in case the reconfiguration included a critical reconfiguration of uplink L1 parameters.

In UTRAN (TS RRC 25.331), the present synchronization problem is solved by an "activation time" (a reference to a certain Connection Frame Number, CFN) that can be included in an RRC message in order to assure that the UE starts using a new configuration exactly at the same time instance as the Node B. This referenced CFN should occur sufficiently far in the future, such that the configuration message can be received by the UE, and the UE has time to issue the required reconfigurations. In a successful operation, the UE and Node B then switch exactly at the same moment to the reconfigured configuration.

Since the RRC message may be subject to radio link control (RLC) retransmissions the activation time must be set far enough into the future to allow for retransmissions of the message. Even if the average retransmission delay is small there are a few percent of the messages that needs several retransmissions. The activation time needs to be set to cover also the worst case which leads to that synchronized re-configuration in UTRAN causes a relatively long delay. This affects the signaling performance.

Thus, there is a need to provide a solution for synchronous reconfigurations in LTE without an activation time, by which the ambiguity with regards to the current configuration in the UE preferably can be avoided.

SUMMARY

Thus an objective problem of the present disclosure is to provide an improved procedure for synchronization between the radio base station and the UE of re-configuration of RRC procedures.

This is achieved by associating a new configuration to be used by a UE with an additional UE identity. The UE is normally identified by a first UE identity, but is informed in a re-configuration message that the UE also has the additional UE identity. The UE is identified by the additional UE identity when the new configuration is to be activated. Hence, when the radio base station detects that the UE responds to requests, which included the additional UE identity, the radio base station can conclude that the UE has activated the new configuration.

According to a first aspect of the present disclosure, a method in a radio base station for activating a radio resource reconfiguration in a UE and in the radio base station is provided such that the radio base station can conclude when the UE is ready to start the new configuration. The UE being subject to the reconfiguration is identifiable by a first UE identity. In the method, a reconfiguration message is sent indicating a new configuration to be used by said UE and the reconfiguration message comprises a second UE identity for said UE. The second UE identity is associated with said new configuration. The new configuration is activated and an indication that the UE is identifiable by the second UE identity is received. When the indication that the UE is identifiable by the second UE identity is received, the UE is ready to start transmission or reception with the new configuration.

According to a second aspect of the present disclosure a method in a UE for activating a radio resource reconfiguration in a UE and in a radio base station is provided such that the radio base station can conclude when the UE is ready to start the new configuration. The UE being subject to the reconfiguration is identifiable by a first UE identity. In the method, a reconfiguration message is received indicating a new configuration to be used by said UE. The reconfiguration message comprises a second UE identity for said UE and the second UE identity is associated with said new configuration. The UE activates the new configuration and indicates to the radio base station that the UE is identifiable by the second UE identity.

According to a third aspect of the present disclosure a radio base station for activating a radio resource reconfiguration in a UE and in the radio base station is provided such that the radio base station can conclude when the UE is ready to start the new configuration. The UE being subject to the reconfiguration is identifiable by a first UE identity. The radio base station comprises a transmitter for sending a reconfiguration message indicating a new configuration to be used by said UE, wherein the reconfiguration message comprises a second UE identity for said UE and the second UE identity is associated with said new configuration, a processing unit for activating the new configuration, a processing unit for activating the new configuration, a receiver for receiving an indication that the UE is identifiable by the second UE identity and a processing unit for concluding that the UE is ready to start transmission or reception with the new configuration when the indication that the UE is identifiable by the second UE identity is received.

According to a fourth aspect of the present disclosure a UE for activating a radio resource reconfiguration in a UE and in a radio base station is provided such that the radio base station can conclude when the UE is ready to start the new configuration. The UE being subject to the reconfiguration is identifiable by a first UE identity. Further, the UE comprises a receiver for receiving a reconfiguration message indicating a new configuration to be used by said UE, wherein the reconfiguration message comprises a second UE identity for said UE and the second UE identity is associated with said new configuration. The UE comprises further a processing unit for activating the new configuration, and a transmitter for indicating to the radio base station that the UE is identifiable by the second UE identity.

An advantage with embodiments of the present disclosure is that a network can start a new configuration with a reduced delay since there is no need for an activation time to synchronize the reconfiguration, such that the new configuration is taken into use simultaneously in both the UE and the radio base station. In particular, with the embodiments of the present disclosure, it is possible to activate the new configuration as soon as the reconfiguration message has been received and processed by the UE, as opposed to the solution with an activation time, where the activation time must be configured to a value larger than the worst-case delay of the transmission of the reconfiguration message as well as longest possible reconfiguration delay in the UE. With a too short activation delay, it could happen that the radio base station would take the new configuration into use before the UE is ready, potentially resulting in a lost connection. Thus, with embodiments of the present disclosure, the average reconfiguration delay is reduced compared to the use of activation times. Furthermore, the solution according to embodiments of the present disclosure is also more robust, as there is no risk of connection loss due to too aggressive activation time values.

DETAILED DESCRIPTION

The present disclosure will be described more fully hereinafter with reference to the accompanying drawings, in which preferred embodiments of the disclosure are shown. The disclosure may, however, be embodied in many different forms and should not be construed as limited to the embodiments set forth herein; rather, these embodiments are provided so that this disclosure will be thorough and complete, and will fully convey the scope of the disclosure to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current disclosure is primarily described in the form of methods and devices, the disclosure may also be embodied in a computer program product as well as a system comprising a computer processor and a memory coupled to the processor, wherein the memory is encoded with one or more programs that may perform the functions disclosed herein.

Accordingly, the present disclosure provides a user equipment (UE), a radio base station (RBS) and methods thereof for synchronizing activation, of a new configuration between the UE and the eNB. By using the methods and arrangements of the present disclosure, the eNB can determine when the UE is ready to use the new configuration. This is achieved by associating a new configuration to be used by the UE with a second UE identity. The UE is normally identified by a first UE identity, but is informed in a re-configuration message that the UE also has the second UE identity. The UE is identified by the second UE identity when the new configuration is to be activated. Hence, when the radio base station detects that the UE is identifiable by the second UE identity, the radio base station can conclude that the UE has activated the new configuration. By using the present disclosure, it is possible for the eNB to deduce if the UE has successfully taken the new configuration into use, regardless of the aforementioned uncertainties in the transmission of the reconfiguration message.

Note that the original configuration will be denoted by "old configuration" and the re-configured configuration by the "new configuration".

An embodiment of the present disclosure will now be described in the context of an LTE network. However, as a person skilled in the art realizes, the embodiments are not limited to LTE but can be applied to other wireless communications networks.

Figure 2:
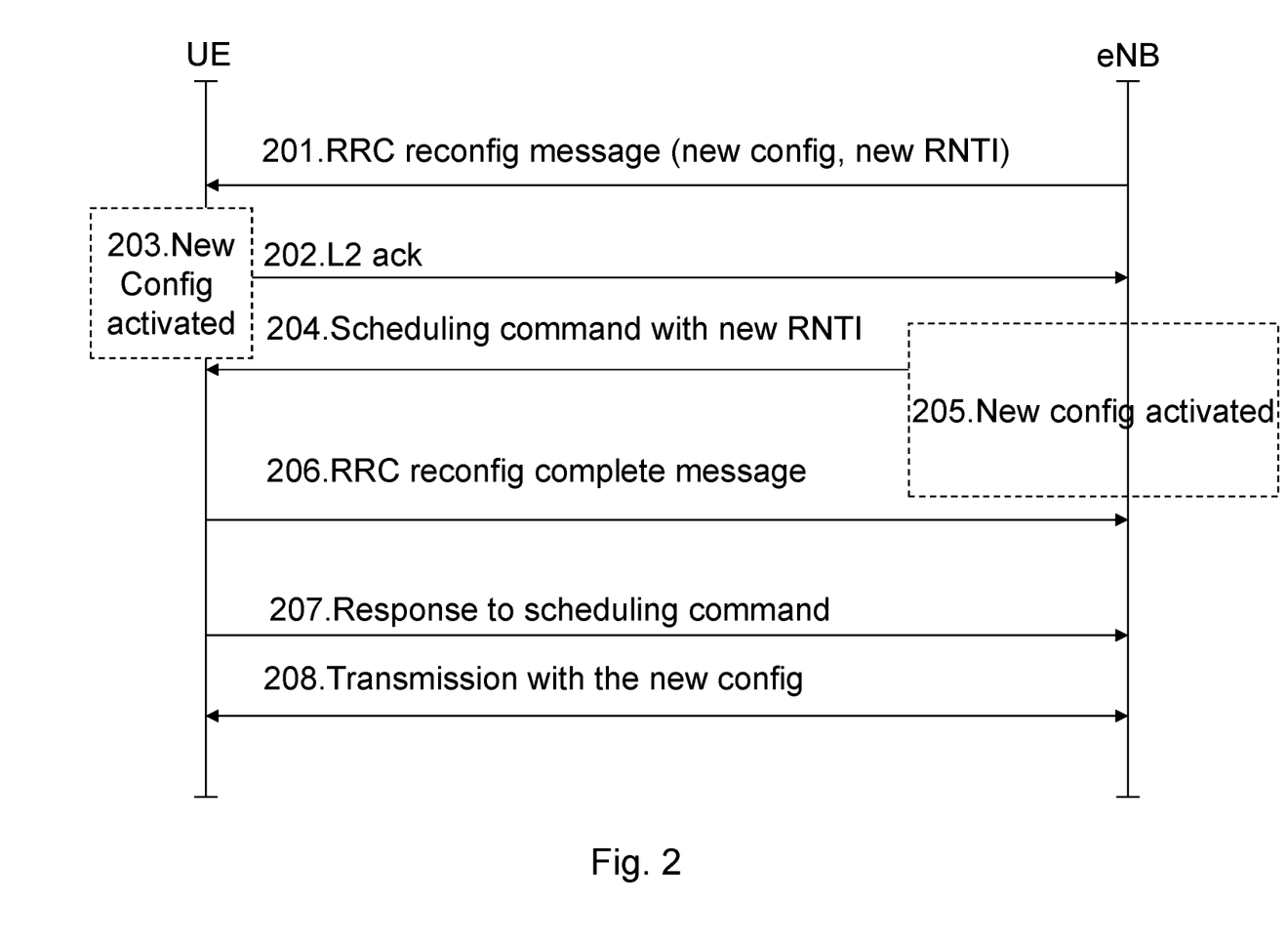
FIG. 2 illustrates a re-configuration procedure according to one embodiment of the present disclosure.

Turning now to FIG. 2, illustrating a radio base station (eNB) and a UE of an LTE network. The eNB is connected to an Evolved Packet Core (EPC) network. Moreover, the UE is identified by a first Radio Network Temporary Identifier (RNTI), exemplified by a C-RNTI, which is a unique identity of the UE in the cell. In a first step 201, the eNB sends a RRC connection re-configuration message to the UE. The RRC connection re-configuration message comprises an indication of the new reconfiguration and a second C-RNTI associated with the new configuration, wherein the second C-RNTI identifies the UE in conjunction with the new configuration.

In a second step 202, the UE may send HARQ feedback to acknowledge the reconfiguration message before the RRC reconfiguration procedure in the UE is finalized. The new configuration is now activated 203 in the UE and the eNB schedules 204 the UE by using the second C-RNTI and may thereby activate the new configuration. Then, the UE sends a RRC reconfiguration complete message 206. The RRC configuration complete message is in this example sent on the new configuration. It should however be noted that the RRC reconfiguration complete message could be sent either before or after the actual reconfiguration. This does not preclude that some other data is sent in parallel or just before the RRC configuration complete message. If sent after reconfiguration, the RRC configuration complete message will be one of the first pieces of data that is sent on the new configuration.

Alternatively, the UE may take the reconfiguration into use a pre-defined time (milliseconds) or subframes after the successful reception or HARQ acknowledgement of the reconfiguration message. This is to ensure that the UE has time to process the content of the reconfiguration message and to ensure that eNB may receive feedback on the reception status in the UE.

As noted, the HARQ feedback may be subject to reception errors, why the eNB provides mechanisms to recover from any misalignment between the anticipated status in the UE and the true status in the UE with regards to the successful reception of the configuration message and the successful completion of the reconfiguration procedure in the UE. The recovery includes the following eNB embodiments:

1. NACK-to-ACK error—The reconfiguration message was not received by the UE: The eNB detects that the UE does not respond to scheduling on the "new" C-RNTI, and may recover the connection to the UE by scheduling the UE on the "old" C-RNTI.
2. ACK-to-NACK error—The eNB assumes that the UE still uses the old configuration, but the UE has taken the new configuration into use. In case the UE does not respond on the "old" C-RNTI, the connection to the UE may be restored by the eNB by scheduling the UE on the "new" C-RNTI.

In case the UE received the reconfiguration message but the message is rejected by the UE, then the UE should request for uplink resources using the "old" C-RNTI according to already agreed procedures.

As stated above, in step 204, the eNB sends a scheduling command to the UE wherein the UE is identified by at least the second RNTI. Then the new configuration is activated 205 by the eNB such that it can receive a response to the scheduling command with the new C-RNTI. When the UE in step 207 obeys to this scheduling command, the eNB can conclude that the UE has activated the new configuration since it responds to the second RNTI which is associated with the new configuration and transmission with the new configuration can start 208. The eNB may schedule the UE using both RNTIs, but the eNB knows that the reconfiguration was successful only when the UE responds on the new RNTI. If both RNTIs are used, the UE may respond to one RNTI at a time. If the UE is configured to use one RNTI at a time, the UE will stop responding to any commands associated with the first RNTI when the second RNTI and associated configuration is taken into use. If the UE does not respond to the scheduling command, then the eNB can try to recover the UE by scheduling with the "old" RNTI, in which case the eNB should again use the old configuration. The need to recover could occur e.g., in the case of a NACK-to-ACK error, as described above.

The approach with multiple C-RNTIs assigned to the same UE, wherein each C-RNTI is associated with a specific configuration outlined above provides means to synchronize the UE re-configuration with the eNB such that the eNB can unambiguously deduce which configuration the UE is currently using. The same result can also be achieved with a UE that uses one RNTI at a time, where the UE abandons the first RNTI when the second RNTI is taken into use.

Figure 3:
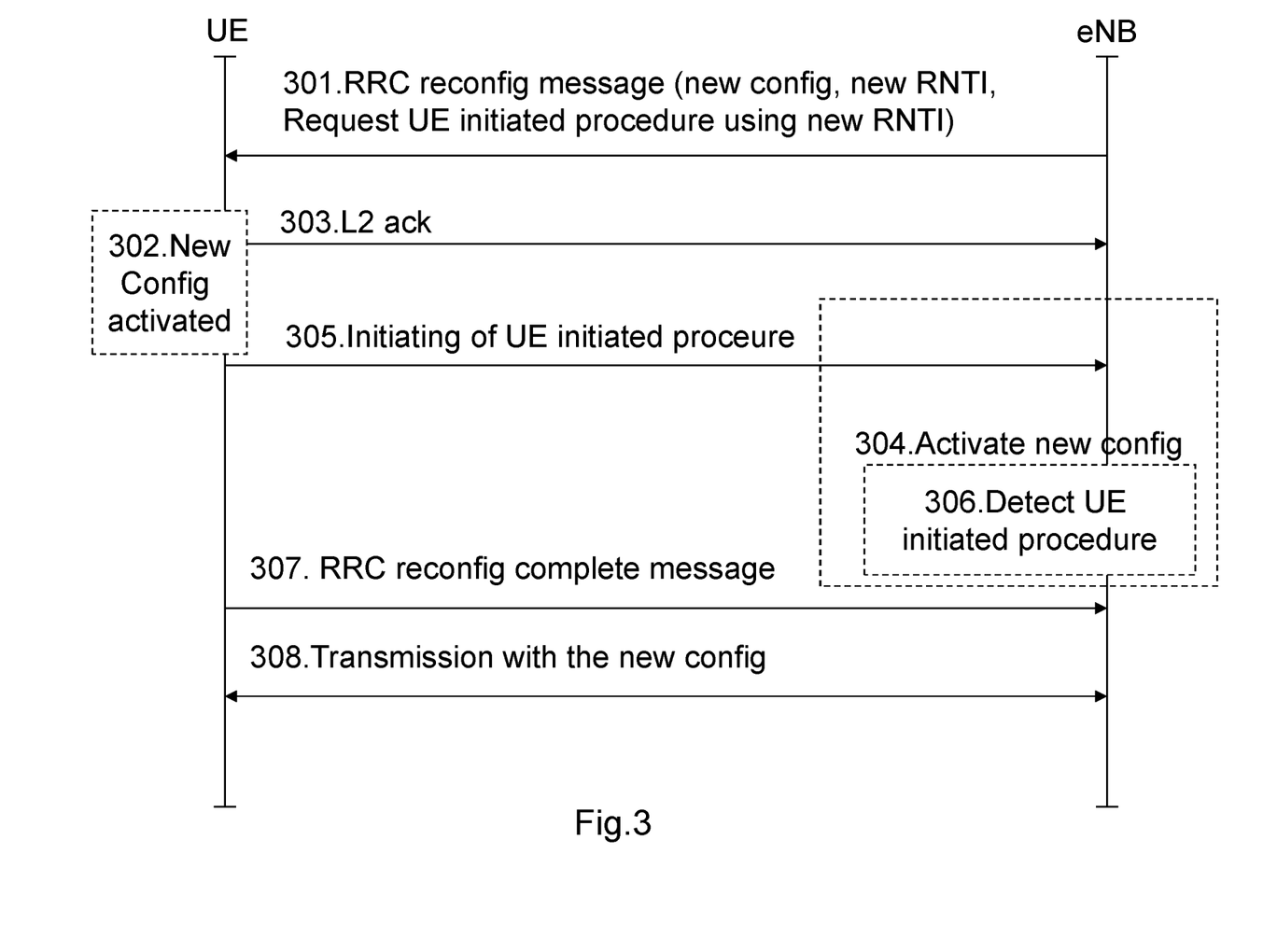
FIG. 3 illustrates a re-configuration procedure according to another embodiment of the present disclosure.

Another way to reduce the timing uncertainty of when the UE takes the new configuration into use is illustrated by further embodiments of the present disclosure. These embodiments introduce the mechanism of commanding the UE to perform a UE initiated procedure such as a Random Access procedure in association with the reconfiguration message prior to taking the new configuration into use as illustrated in FIG. 3. In particular, the eNB sends in step 301 a RRC reconfiguration message comprising the new configuration, a second UE identity such as a second C-RNTI associated with the new configuration and a request to the UE to perform a UE initiated procedure using the second C-RNTI). If the UE decodes the RRC reconfiguration message correctly, the UE activates in step 302 the new configuration and sends in step 303 a layer 2 acknowledgement. In response to the request to perform a UE initiated procedure, the UE initiates the UE initiated procedure in step 305 using the second C-RNTI. When the eNB in step 306 detects that the UE has initiated the requested UE initiated procedure, the eNB can conclude that the UE is ready to use the new configuration. During, or preferably after the detection of the UE initiated procedure, the eNB activates 304 the new configuration. (In general, the UE initiated procedure, e.g., the RACH procedure, is independent of the actual reconfiguration that is associated with the RNTI, i.e., the eNB only needs to be prepared to receive the RA attempt by the UE.) Using the new configuration, the UE sends 307 a layer 3 (RRC reconfiguration complete message) acknowledgement. It should however be noted that the RRC reconfiguration complete message could be sent either before or after the actual reconfiguration. Then, transmission with the new configuration between the UE and the eNB can start as illustrated by step 308.

With this approach, the eNB can assume that the UE uses the new configuration when it detects that the UE has initiated the UE initiated procedure, i.e., when the UE initiated procedure is a random access procedure the eNB detects that the UE has initiated (and in this case also completed) the UE initiated procedure when the UE appears on the Random Access Channel (RACH).

The eNB may allocate a contention free resource for the RA attempt. In accordance with the present disclosure, the new configuration is associated with the second UE identity (e.g., the second C-RNTI), such that the RA procedure resulting from the command in the reconfiguration message can be distinguished from any other random access attempts initiated by a UE or the eNB.

Furthermore, the UE may be configured to be scheduled on multiple UE identities (e.g., C-RNTIs), wherein each of the multiple UE identities is associated with a configuration. Accordingly, the UE may be configured to obey the commands following the configurations associated with each of the UE identities. In addition, the eNB may also configure or re-configure multiple UE configurations to the UE, where each of the configurations is associated with a unique UE identity.

In this case, multiple identities may be configured to the UE, each of which is associated with a separate identity. In such a case one configuration may be used while reconfiguring the other. Further, it is possible to switch between the different configurations by simply assigning grants using the available RNTIs.

Figure 4:
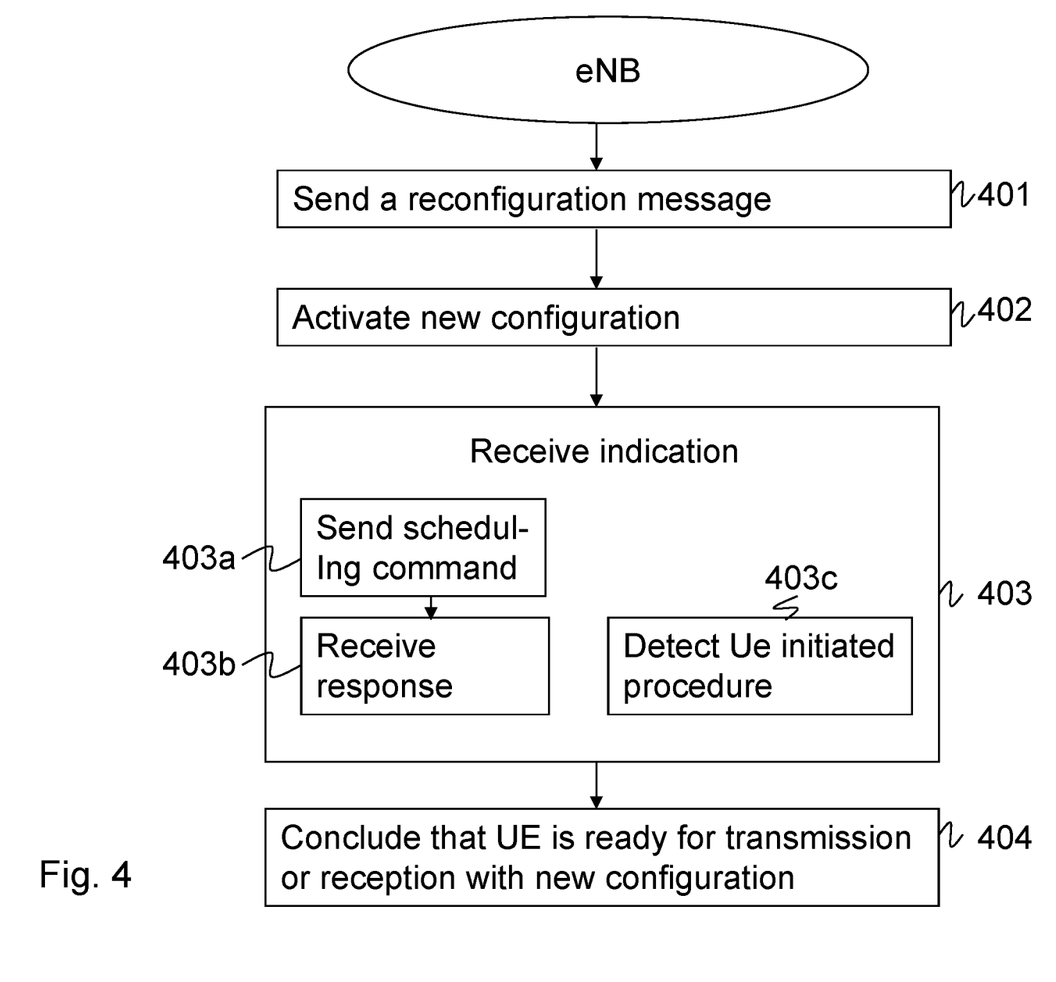
FIGS. 4 and 5 illustrate flowcharts of methods according to embodiments of the present disclosure.
Figure 5:
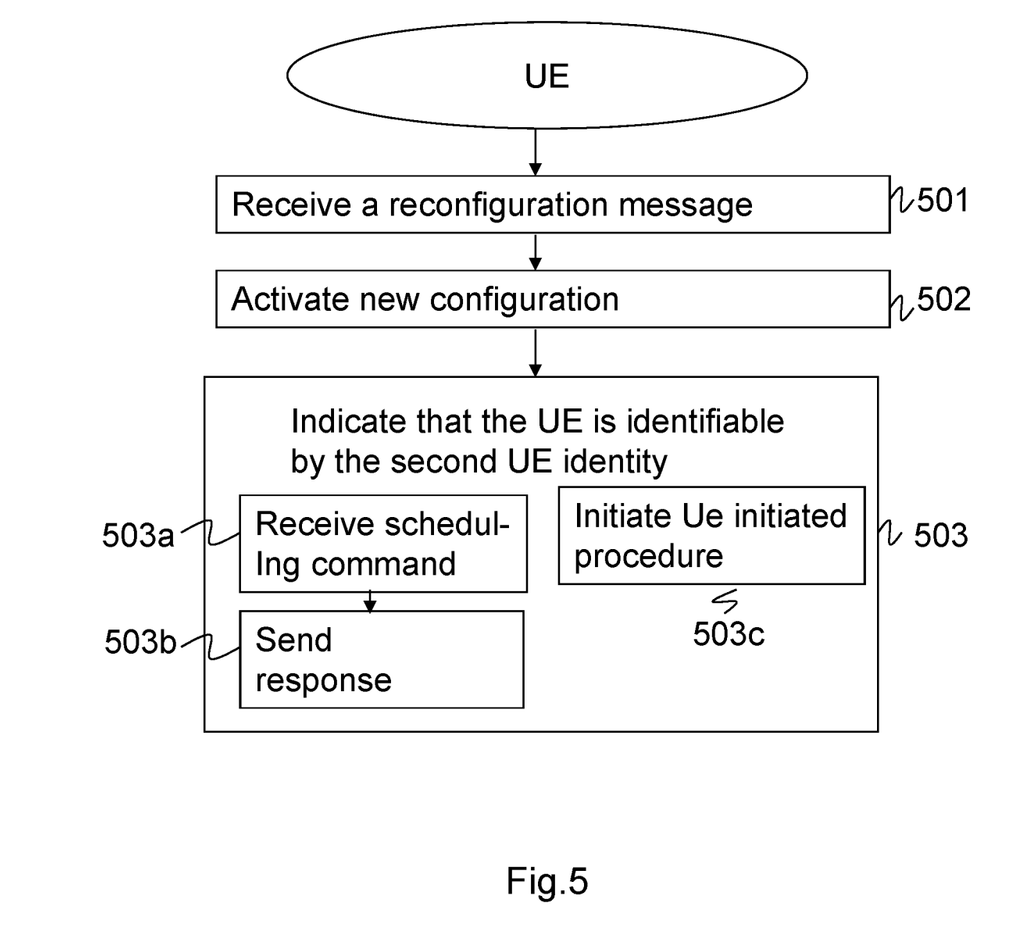

As illustrated in the flowcharts of FIGS. 4 and 5, embodiments of the present disclosure relate to a method in the UE and to a method in the eNB. The methods concern activation of radio resource reconfigurations in a UE and in a radio base station, wherein the UE being subject to the reconfiguration is identifiable by a first UE identity. By using the methods the eNB can determine when the UE is ready to use the new configuration.

The method in the radio base station is illustrated in FIG. 4 and comprises the steps of:
   401. Send a reconfiguration message indicating a new configuration to be used by said UE, wherein the reconfiguration message comprises a second UE identity for said UE and the second UE identity is associated with said new configuration.
   402. Activate the new configuration.
   403. Receive an indication that the UE is identifiable by the second UE identity. Note that step 403 may be performed prior to 402 in some embodiments of the present disclosure.
   404. Conclude that the UE is ready to start transmission or reception with the new configuration when the indication that the UE is identifiable by the second UE identity is received.

According to one embodiment, step 402 comprises the further steps of:
   403a. Send a scheduling command to said UE by using at least the second UE identity.
   403b. Receive a response to the scheduling command with the second UE identity.

According to a further embodiment, the reconfiguration message comprises a request to the UE to perform a UE initiated procedure in association with the reconfiguration, and the step 403 comprises the step of detecting 403c an indication that the UE initiated procedure is initiated.

The method in the UE is illustrated in FIG. 5 and comprises the steps of:
   501. Receive a reconfiguration message indicating a new configuration to be used by said UE, wherein the reconfiguration message comprises a second UE identity for said UE and the second UE identity is associated with said new configuration.
   502. Activate the new configuration.
   503. Indicate to the radio base station that the UE is identifiable by the second UE identity.

According to an embodiment of the present disclosure, the step 503 comprises the steps of:

503a. Receive a scheduling command, wherein the UE is identified by the at least the second UE identity.

503b. Send a response to the scheduling command.

According to a further embodiment, the reconfiguration message comprises a request to the UE to perform a UE initiated procedure in association with the reconfiguration, and the step 503 comprises the step of initiate 503c the UE initiated procedure in association with the reconfiguration.

Figure 6:
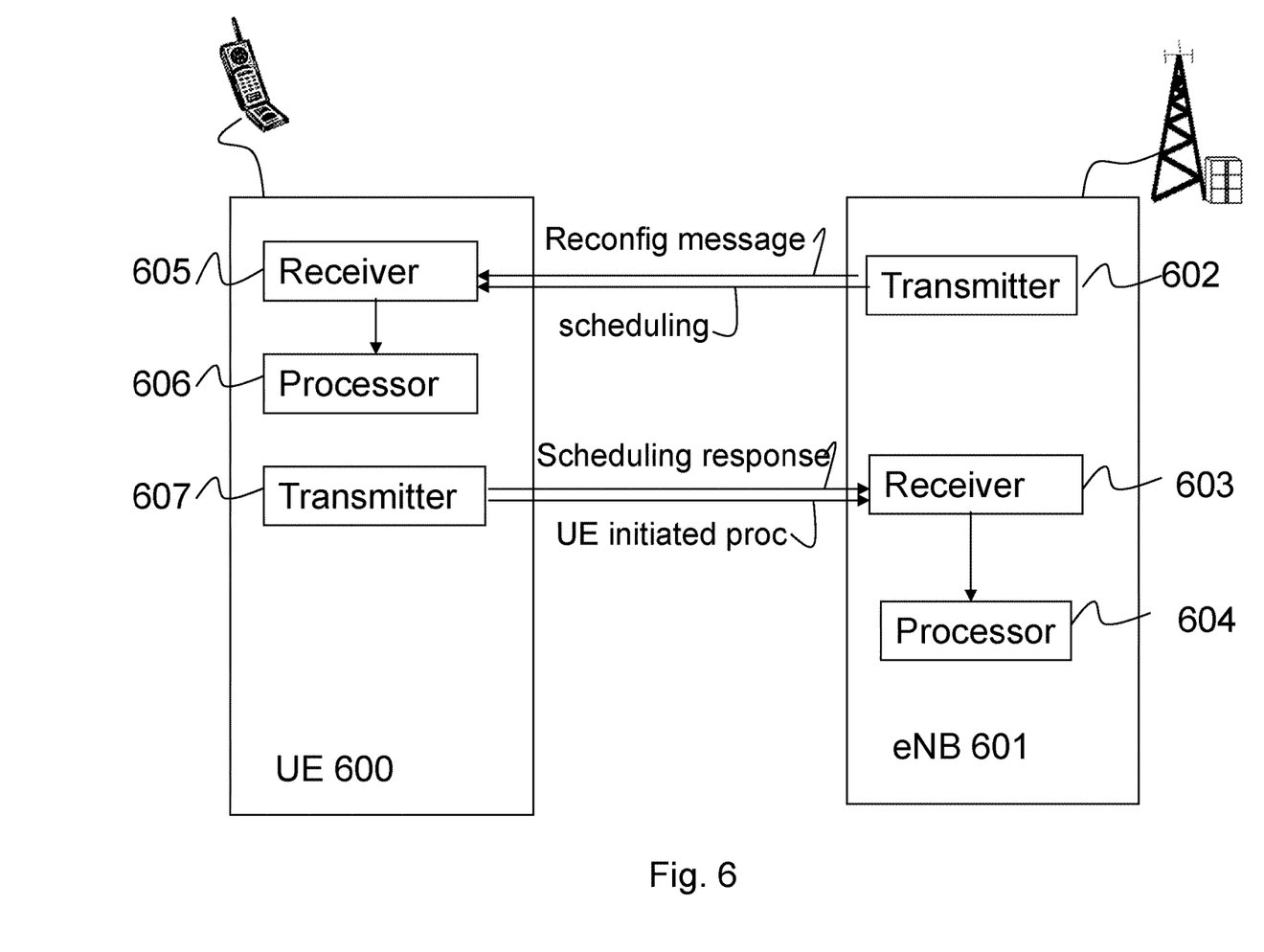
FIG. 6 shows schematically the UE and the radio base station according to embodiments of the present disclosure.

Accordingly, embodiments of the present disclosure relates to a radio base station 601 (e.g., an eNB) and to a UE 600 as illustrated in FIG. 6. The UE being subject to the reconfiguration is identifiable by a first UE identity. The radio base station comprises a transmitter 602 for sending a reconfiguration message indicating a new configuration to be used by said UE, wherein the reconfiguration message comprises a second UE identity for said UE and the second UE identity is associated with said new configuration. The radio base station comprises further a processing unit 604 for activating the new configuration. The UE comprises a receiver 605 for receiving the reconfiguration message. Moreover, the UE comprises a processing unit 606 for activating the new configuration, and a transmitter 607 for indicating to the radio base station that the UE is identifiable by the second UE identity since it has activated the new configuration. Hence, the radio base station comprises further a receiver 603 for receiving an indication that the UE is identifiable by the second UE identity and the processing unit 604 for determining that the UE is ready to use the new configuration when the indication that the UE is identifiable by the second UE identity is received.

The transmitter 602 of the radio base station is further configured to send a scheduling command to said UE by using at least the second UE identity and the receiver of the UE is further configured to receive the scheduling command. The receiver 603 of the radio base station is hence configured to receive a response to the scheduling command with the second UE identity and the transmitter 602 of the UE is configured to send a response to the scheduling command, accordingly.

The transmitter 602 of the radio base station is further configured to send the scheduling command to the UE by using at least the second UE identity e.g., when an acknowledgement to the reconfiguration message is received at the radio base station from the UE.

According to one embodiment, the reconfiguration comprises a request to the UE to perform a UE initiated procedure in association with the reconfiguration. In this case the processing unit 606 of the UE is configured to initiate the UE initiated procedure in association with the reconfiguration and the receiver 603 of the radio base station is configured to detect that the UE initiated procedure is initiated.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A method in a radio base station for activating a radio resource reconfiguration in a User Equipment, UE, and in the radio base station, wherein the UE being subject to the reconfiguration is identifiable by a first UE identity, the method comprising:

sending a reconfiguration message indicating a new configuration to be used by the UE, wherein the reconfiguration message comprises:
a request to the UE to perform a UE initiated procedure in association with the reconfiguration; and
a second UE identity for the UE and the second UE identity is associated with said new configuration;
activating the new configuration;
receiving an indication that the UE is identifiable by the second UE identity wherein the receiving an indication comprises:
detecting an indication that the UE initiated procedure is initiated;
sending a scheduling command to said UE by using at least the second UE identity;
receiving a response to the scheduling command with the second UE identity; and
concluding that the UE is ready to start transmission or reception with the new configuration when the indication that the UE is identifiable by the second UE identity is received.

2. The method according to claim 1, wherein the sending the scheduling command to the UE by using at least the second UE identity is performed when an acknowledgement to the reconfiguration message is received at the radio base station from the UE.

3. The method according to claim 1, wherein the UE initiated procedure is a Random Access procedure.

4. The method according to claim 1, wherein the reconfiguration is sent in a radio resource control protocol message.

5. A method in a User Equipment (UE) for activating a radio resource reconfiguration in a UE and in a radio base station, wherein the UE being subject to the reconfiguration is identifiable by a first UE identity, and wherein the method comprises:

receiving a reconfiguration message indicating a new configuration to be used by said UE, wherein the reconfiguration message comprises:
a request to the UE to perform a UE initiated procedure in association with the reconfiguration; and
a second UE identity for said UE and the second UE identity is associated with said new configuration;
activating the new configuration; and
indicating to the radio base station that the UE is identifiable by the second UE identity, wherein the indicating comprises:
initiating the UE initiated procedure in association with the reconfiguration;
receiving a scheduling command, wherein the UE is identified by at least the second UE identity; and
sending a response to the scheduling command; and
wherein the first UE identity is a first Radio Network Temporary Identifier (RNTI); and
wherein the second UE identity is a second RNTI.

6. The method according to claim 5, wherein the UE initiated procedure is a Random Access procedure.

7. The method according to claim 5, wherein the reconfiguration is received in a radio resource control protocol message.

8. A radio base station for activating a radio resource reconfiguration in a User Equipment (UE) and in the radio base station, wherein the UE being subject to the reconfiguration is identifiable by a first UE identity, said radio base station comprising:
a transmitter configured to:

send a reconfiguration message indicating a new configuration to be used by said UE, wherein the reconfiguration message comprises:
   a request to the UE to perform a UE initiated procedure in association with the reconfiguration; and
   a second UE identity for said UE and the second UE identity is associated with said new configuration;
send a scheduling command to said UE by using at least the second UE identity; and
receive a response to the scheduling command with the second UE identity;
a processing circuit configured to:
   activate the new configuration; and
   determine that the UE is ready to start transmission or reception with the new configuration when the indication that the UE is identifiable by the second UE identity is received; and
a receiver configured to:
   detect an indication that the UE initiated procedure is initiated; and
   receive an indication that the UE is identifiable by the second UE identity; and
wherein the first UE identity is a first Radio Network Temporary Identifier (RNTI); and
wherein the second UE identity is a second RNTI.

9. The radio base station according to claim 8, wherein the transmitter is configured to send the scheduling command to the UE by using at least the second UE identity when an acknowledgement to the reconfiguration message is received at the radio base station from the UE.

10. The radio base station according to claim 8, wherein the UE initiated procedure is a Random Access procedure.

11. The radio base station according to claim 8, wherein the reconfiguration is sent in a radio resource control protocol message.

12. A User Equipment (UE) for activating a radio resource reconfiguration in a UE and in a radio base station, wherein the UE being subject to the reconfiguration is identifiable by a first UE identity, said UE comprising:
a receiver configured to:
   receive a reconfiguration message indicating a new configuration to be used by said UE, wherein the reconfiguration message comprises:
     a request to the UE to perform a UE initiated procedure in association with the reconfiguration; and
     a second UE identity for said UE, wherein the second UE identity is associated with said new configuration;
   receive a scheduling command, wherein the UE is identified by at least the second UE identity; and
a processing circuit configured to:
   activate the new configuration; and
   initiate the UE initiated procedure in association with the reconfiguration; and
a transmitter configured to:
   indicate to the radio base station that the UE is identifiable by the second UE identity; and
   send a response to the scheduling command;
wherein the first UE identity is a first Radio Network Temporary Identifier (RNTI); and
wherein the second UE identity is a second RNTI.

13. The UE according to claim 12, wherein the UE initiated procedure is a Random Access procedure.

14. The UE according to claim 12, wherein the reconfiguration is received in a radio resource control protocol message.

* * * * *

UNITED STATES PATENT AND TRADEMARK OFFICE
CERTIFICATE OF CORRECTION

PATENT NO. : 10,595,290 B2
APPLICATION NO. : 15/978244
DATED : March 17, 2020
INVENTOR(S) : Sågfors et al.

It is certified that error appears in the above-identified patent and that said Letters Patent is hereby corrected as shown below:

On the Title Page

In Item (72), under "First Inventor", in Column 1, Line 1, delete "Kyrkslött (FI);" and insert -- Kyrkslätt (FI); --, therefor.

In the Drawings

In Fig. 1, Sheet 1 of 6, delete Tag "EUTRAN" and insert Tag -- E-UTRAN --, therefor.

In the Specification

In Column 1, Line 7, delete "2013," and insert -- 2013, now Pat. No. 14/055,373, --, therefor.

In Column 2, Line 10, delete "Identity)." and insert -- Identifier). --, therefor.

In Column 7, Line 40, delete "C-RNTI)." and insert -- C-RNTI. --, therefor.

Signed and Sealed this
Fourth Day of August, 2020

Andrei Iancu
*Director of the United States Patent and Trademark Office*